(12) United States Patent
Summerfield et al.

(10) Patent No.: US 10,304,464 B2
(45) Date of Patent: May 28, 2019

(54) VOICE RECOGNITION SYSTEM AND METHODS

(75) Inventors: Clive Summerfield, Downer (AU); Joel Moss, Weetangerah (AU)

(73) Assignee: Auraya Pty. Ltd., Dickson (AU)

( * ) Notice: Subject to any disclaimer, the term of this patent is extended or adjusted under 35 U.S.C. 154(b) by 1078 days.

(21) Appl. No.: 12/523,910

(22) PCT Filed: Jan. 22, 2008

(86) PCT No.: PCT/AU2008/000070
§ 371 (c)(1),
(2), (4) Date: Mar. 29, 2010

(87) PCT Pub. No.: WO2008/089508
PCT Pub. Date: Jul. 31, 2008

(65) Prior Publication Data
US 2010/0179813 A1    Jul. 15, 2010

(30) Foreign Application Priority Data

Jan. 22, 2007    (AU) ................................ 2007900305

(51) Int. Cl.
*G10L 17/00*    (2013.01)
*G10L 17/14*    (2013.01)
(52) U.S. Cl.
CPC ................................... *G10L 17/14* (2013.01)
(58) Field of Classification Search
CPC .. G06F 21/32; G06F 21/34; G06F 2221/2129;
G06F 21/31; G06F 21/44; G06F 21/54;
G06F 8/61; G06F 9/445; G10L 17/005;
G10L 17/04; G10L 17/22; G10L 15/02;
G10L 17/00; G10L 17/14; H04L 63/10;
H04L 43/08; H04L 47/808; H04L 63/04;
H04L 67/306; H04L 9/0844; H04L 9/32;
H04L 67/02; H04L 63/20; H04L 9/321;
H04L 29/12122; H04L 41/0293;
(Continued)

(56) References Cited

U.S. PATENT DOCUMENTS 5,339,361 A *    8/1994 Schwalm et al. ............. 713/169
5,913,196 A       6/1999 Talmor et al.
(Continued)

FOREIGN PATENT DOCUMENTS

WO        2004092877        10/2004
WO    WO 2004092877 A2 *  10/2004

OTHER PUBLICATIONS

U.S. Patent Application Publication No. 2005/0138391 entitled Biometric Multimodal Centralized Authentication Service, Inventor Mandalia et al., published Jun. 23, 2005.
(Continued)

*Primary Examiner* — Michael Ortiz-Sanchez
(74) *Attorney, Agent, or Firm* — Price Heneveld LLP (57) ABSTRACT

The present invention relates to a method of providing voice recognition. The method comprises the steps of receiving a packetised voice data of a person to be identified over a packet-switched network, comparing the voice data with a stored voice data of a user and, based on the comparison, providing an indication of the likelihood that the person to be identified is the user, wherein the step of receiving the voice data comprises waiting for sufficient voice data to be received.

21 Claims, 4 Drawing Sheets

(58) Field of Classification Search
CPC ..... H04L 61/1547; H04L 67/28; H04L 63/08; H04L 63/18; H04W 12/08; H04W 12/00; H04W 12/06; H04W 48/14; H04M 1/66; G06Q 50/265
USPC .................................................. 704/246–250
See application file for complete search history.

(56) References Cited

U.S. PATENT DOCUMENTS

| | | | |
|---|---|---|---|
| 6,275,797 B1 | 8/2001 | Randic | |
| 7,487,089 B2* | 2/2009 | Mozer | 704/246 |
| 7,685,523 B2* | 3/2010 | Calderone et al. | 715/728 |
| 8,280,740 B2* | 10/2012 | Di Mambro et al. | 704/273 |
| 8,396,711 B2* | 3/2013 | Yee et al. | 704/246 |
| 2002/0104025 A1* | 8/2002 | Wrench, Jr. | H04L 9/08 726/3 |
| 2003/0163739 A1* | 8/2003 | Armington | G06F 21/32 726/3 |
| 2004/0243514 A1* | 12/2004 | Wankmueller | 705/40 |
| 2006/0106606 A1* | 5/2006 | Labaton | 704/250 |
| 2007/0055517 A1* | 3/2007 | Spector | G06F 21/32 704/246 |
| 2007/0255564 A1* | 11/2007 | Yee et al. | 704/246 |
| 2008/0091425 A1* | 4/2008 | Kane | 704/246 |
| 2008/0294435 A1* | 11/2008 | Reynolds et al. | 704/246 |
| 2008/0301701 A1* | 12/2008 | Khijniak | G06F 21/57 719/311 |
| 2009/0025071 A1* | 1/2009 | Mumm et al. | 726/7 |
| 2009/0187405 A1* | 7/2009 | Bhogal et al. | 704/246 |
| 2009/0222517 A1* | 9/2009 | Kalofonos | G06Q 10/10 709/204 |
| 2010/0027469 A1* | 2/2010 | Gurajala | G06Q 30/016 370/328 |
| 2010/0106503 A1* | 4/2010 | Farrell et al. | 704/246 |
| 2011/0099015 A1* | 4/2011 | Zopf | 704/270 |

OTHER PUBLICATIONS

U.S. Patent Application Publication No. 2003/0037004 entitled Dialog-Based Voiceprint Security for Business Transactions, Inventor Buffum et al., published Feb. 20, 2003.
U.S. Patent Application Publication No. 2002/0007462 entitled User Authentication System, Inventor Omata, published Jan. 17, 2002.
U.S. Patent Application Publication No. 2006/0018440 entitled Method and System for Predictive Interactive Voice Recognition, Inventor Watkins et al., published Jan. 26, 2006.
Australian Office Action, dated Jun. 7, 2012, 2 pages.

* cited by examiner

VOICE RECOGNITION SYSTEM AND METHODS

FIELD OF THE INVENTION

The present invention relates generally to systems and methods for providing voice recognition and more particularly, but not exclusively, to systems and methods which may be used for verifying the identity of persons over packet-switched networks, such as the Internet.

BACKGROUND OF THE INVENTION

Voice authentication systems are becoming increasingly popular for providing access control. For example, voice authentication systems are currently being utilised in telephone banking systems, automatic teller machines, building or office entry access system, etc.

Voice authentication is typically conducted over a fixed telephone network (e.g. a PSTN telecommunications network) as a two stage process. The first stage, or enrollment stage, involves storing a sample of a person's voice to extract and encode their unique voice characteristics. The second stage, or authentication stage, involves receiving a voice sample of a person to be identified over the phone and comparing the voice characteristics of the received sample with those of the stored voice sample, using a voice authentication engine. A measure as to how closely the voice sample of the person to be identified compares to the stored voice sample (and therefore the likelihood that the person is, in fact, the same as that being claimed) is then outputted by the voice authentication engine.

A problem with such voice authentication systems is that they require significant infrastructure expense on the part of the secure service provider and there is also expense incurred by users of the system in placing the calls. Furthermore, persons who do not have access to a phone line are unable to participate.

SUMMARY OF THE INVENTION

In accordance with a first aspect, the present invention provides a method of providing voice recognition comprising the steps of receiving a packetised voice data of a person to be identified over a packet-switched network, comparing the voice data with a stored voice data of a user and, based on the comparison, providing an indication of the likelihood that the person to be identified is the user, wherein the step of receiving the voice data comprises waiting for sufficient voice data to be received to make a verifiable comparison.

In an embodiment, the step of waiting for sufficient voice data to be received comprises determining whether sufficient voice data has been received to make the comparison. In an embodiment, if it is determined that sufficient voice data has not been received, a step of re-sending at least a part of the voice data is made. In an embodiment, if it is determined that sufficient voice data has not been received, a step of re-sending all the voice data is made.

In the context of the specification, the term "packetised data" is intended to be interpreted broadly and is to be understood as any one or more packets of data which may be reconstructed in order to make a verifiable comparison. Furthermore, it is to be understood that the term "voice recognition", as used herein, encompasses both speech recognition and voice authentication. In other words, voice recognition may include within its scope not only verifying the identity of a person, but also identifying what words the person has spoken.

In an embodiment, the step of receiving the voice data comprises waiting for sufficient voice data to be received to make a verifiable comparison before performing said comparison step.

In an embodiment, the voice data is sent over the Internet as an electronic file. In an embodiment, the voice data is sent using conventional IP communication techniques.

In an embodiment all of the voice data is received before performing said comparison step.

In an embodiment, a message identifier is associated with the voice data and the message identifier is processed to determine if the voice data is valid. In an embodiment the message identifier is a time stamp and/or session identifier.

In an embodiment the voice data is compressed using a compression algorithm, such as the WAV compression algorithm.

An advantage of at least an embodiment of the invention is that reliable voice recognition techniques can be provided over lossy packet-switched communications networks, such as the Internet. Waiting to receive sufficient voice data facilitates verification performance, irrespective of the network bandwidth or congestion. Thus, embodiments of the present invention may provide that the performance and accuracy of the voice recognition is maintained even over wireless networks and low-speed dial-up modems.

In accordance with a second aspect the present invention provides a system for providing voice recognition, the system comprising a receiver for receiving a packetised voice data of a person to be identified over a packet-switched network; and a processor arranged to compare the received packetised voice data with a stored voice data of a user, and based on the comparison, output an indication of the likelihood that the person to be identified is the user; wherein the processor waits for sufficient voice data to be received to make a verifiable comparison.

In accordance with a third aspect, the present invention provides a method of providing voice recognition comprising the steps of receiving a file containing a complete voice sample of a person to be identified, comparing the voice sample with a stored voice data of a user and, based on the comparison, providing an indication of the likelihood that the person to be identified is the user.

In an embodiment, the file is sent over a packet-switched network.

In the context of the specification the phrase "file" is to be understood as any sequence or stream of bits which may be suitable for storing the voice sample. In an embodiment, the file may have been compressed using a suitable compression and/or encoding algorithm for compressing and/or encoding the contents of the file.

In accordance with a fourth aspect the present invention provides a secure service provider system comprising a receiver for receiving, from a third party verification system, data providing an indication of the likelihood that a person wanting to access a secure service of the secure service provider is a verified person; and a processor which utilises the received data to determine whether to allow access to the person.

In accordance with a fifth aspect the present invention provides a method for determining whether to allow a person access to a secure service, the method comprising the steps of receiving, from a third party verification system, data providing an indication of the likelihood that the person is a verified person; and utilising the received data to determine whether to allow access to the person.

In accordance with a sixth aspect the present invention provides a method of verifying the identity of a person wanting to access a secure service, the method comprising providing a device to a user computing system of the person, the device arranged to cause the computing system to record a voice data of the person and to send the recorded voice data to a verification system over a packet-switched network for verifying the person's identity.

In accordance with a seventh aspect, the present invention provides a third party verification system for enabling access to a secure service provider system, the third party verification system including a voice authentication server arranged to verify the identity of a person wanting to access the secure service provider system and to provide verification data to the secure service provider system.

In accordance with an eighth aspect there is provided a method for enabling access to a secure service provider system, the method comprising the steps of a third party verification system verifying the identity of a person wanting to access the secure service provider system and providing verification data to the secure service provider system.

In an embodiment, the step of verifying the person's identity includes comparing voice data received from the person with stored voice data of a user. In an embodiment the verification data includes an indication of the likelihood that the person to be identified is the user. In an embodiment the secure service provider system utilises the verification data to determine whether to allow access to the person.

An advantage of at least an embodiment of the fifth, sixth, seventh and eighth aspects of the invention is that voice recognition may be conducted by a third party verification system, thereby minimising expense on behalf of the secure service provider. In an embodiment the secure service provider utilises one or more business rules to make the determination.

In accordance with a ninth aspect the present invention provides a secure service provider system providing a secure service, the system comprising a transmitter arranged to provide a device to a user computing system of a person wanting to access the secure service, the device arranged to cause the computing system to record a voice data of the person and to send the recorded voice data to a verification system over a packet-switched network for making a verification.

In accordance with a tenth aspect the present invention provides a device utilisable by a user computing system to carry out verification of a person, the device arranged to instruct the computing system to record a voice data of the person and to send the voice data to a verification system over a packet-switched network.

In an embodiment, the device is computer software arranged to be loaded onto the user computing system.

In accordance with an eleventh aspect the present invention provides a method of determining fraudulence in a verification process, the method comprising the steps of receiving a voice data of a person to be identified, comparing the voice data with voice data previously provided for verification and, based on the comparison, providing an indication of the likelihood that the received voice data is fraudulent.

In an embodiment the voice data is considered fraudulent if the indication is above a predetermined threshold.

In an embodiment the previously provided voice data was provided to gain access to a secure service provider site.

In an embodiment a challenge response is initiated if the received voice data is fraudulent. In an embodiment the challenge response comprises the further step of requesting that the person repeats at least one randomly generated alphanumeric character or string and providing a recording of the person uttering the at least one randomly generated alphanumeric character or string as voice data for verification.

In accordance with a twelfth embodiment, there is provided a method of providing speech recognition, comprising the steps of receiving a packetised voice data of a person over a packet-switched network, and analysing the received voice data to recognise speech, wherein the step of receiving the voice data comprises waiting for sufficient voice data to be received to enable speech recognition.

In accordance with a thirteenth embodiment, there is provided a method of providing speech recognition, comprising the steps of receiving a file containing a complete voice sample and analysing the received voice sample to recognise speech.

In accordance with a fourteenth aspect the present invention provides a computer program comprising at least one instruction for controlling a computing system to implement a method in accordance with any one of the first, third, fifth, sixth, twelfth or thirteenth aspects.

In accordance with a fifteenth aspect the present invention provides a computer program comprising at least one instruction for controlling a computing system to implement a method in accordance with the eighth aspect.

In accordance with a sixteenth aspect the present invention provides a computer program comprising at least one instruction for controlling a computing system to implement a method in accordance with the eleventh aspect.

In accordance with a seventeenth aspect the present invention provides a computer readable medium providing a computer program in accordance with any one of the twelfth, thirteenth, fourteenth, fifteenth or sixteenth aspects.

In accordance with an eighteenth aspect there is provided a data signal comprising the program code according to any one of the twelfth through sixteenth aspects.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF PREFERRED EMBODIMENTS

For the purposes of illustration, and with reference to the figures, an embodiment of the invention will hereafter be described in the context of a voice recognition system and method for a secure Internet banking service, whereby an identity of a customer must be verified before access is granted to their customer account.

Figure 1:
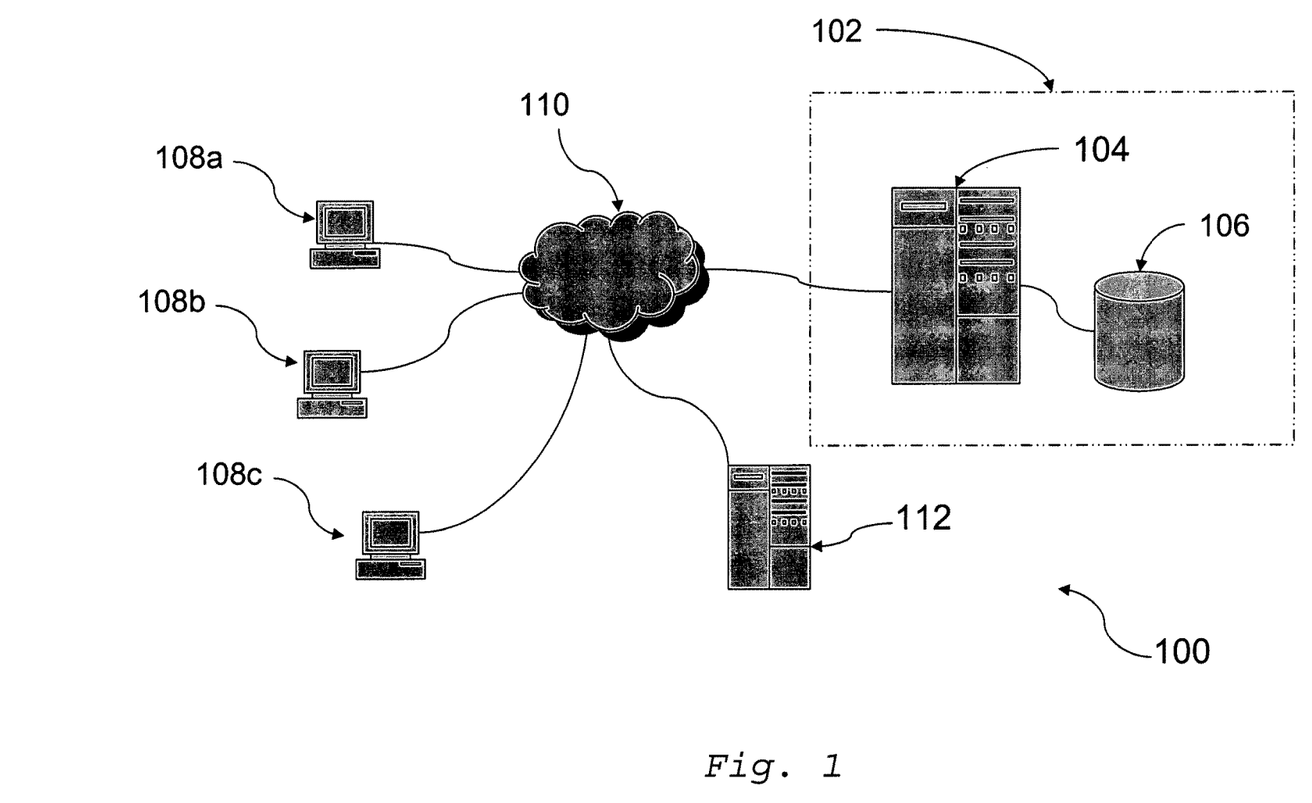
FIG. 1 is a block diagram of a system in accordance with an embodiment of the present invention.

FIG. 1 illustrates an example system configuration 100 for implementing a verification process in accordance with an embodiment of the present invention.

Distinct from conventional voice authentication systems, embodiments of the present invention provide a third party verification system for verifying the identity of persons wanting to access a secure service provided by the secure service provider system 112. The system 100 includes a third party verification system 102 (hereafter "verification system 102") in the form of voice authentication server 104 and voiceprint database 106; user computing devices 108; communication system 110 in the form of the Internet; and secure service provider system 112 in the form of an Internet banking server hosting a secure customer banking web site.

Before verification can take place, a customer of the Internet banking web site must have previously provided the third party verification system 102 with a voice sample for comparison. Accordingly, before describing embodiments of the present invention for carrying out verification, a typical process for enrolling with the third party verification system 102 will be described with reference to FIG. 2.

Figure 2:
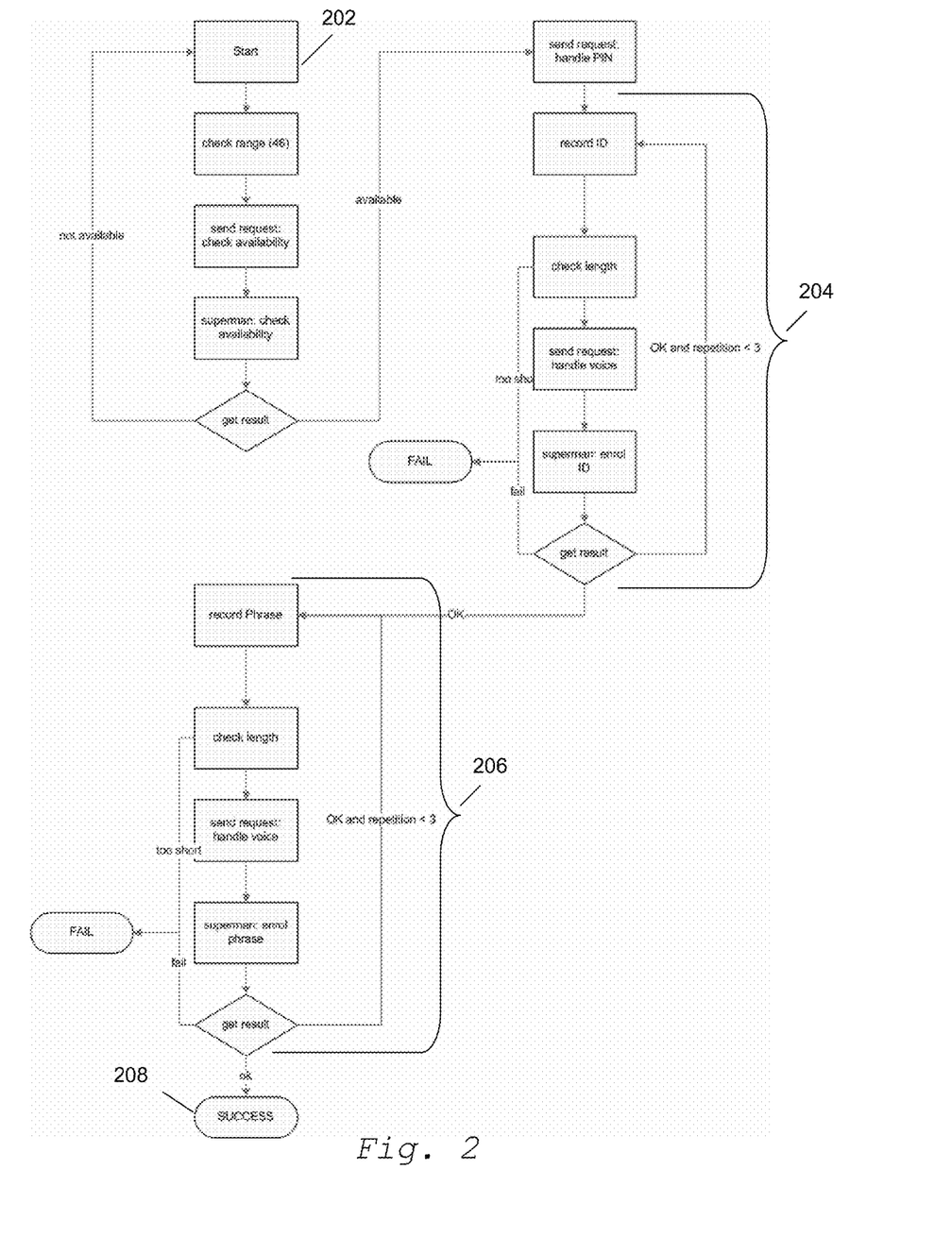
FIG. 2 is a flow diagram showing the method steps for enrolling, in accordance with an embodiment of the invention.

The process begins at step 202 where, using a standard telephone, the customer dials a telephone number of the verification system 102. The verification system 102 automatically answers the customer's call and asks them to say their bank account number three times so as to obtain an accurate voice print of the customer. According to this embodiment, the minimum length of the voice sample accepted by the verification system 102 is 0.5 seconds. The customer's voice sample is subsequently recorded as a voice template by the voice authentication server 104 using conventional techniques and stored in the database 106. The server 104 checks the voice template to determine if it contains the required speech sample and trims the sample to remove any gaps of silence within the sample. For easy access, the voiceprint template is stored in association with a specific customer identification number, such as the specified bank account number of the customer (step 204). Once the voiceprint template has been stored, the third party verification system 102 asks the user to repeat a passphrase three times (again, so as to obtain an accurate voice print). The passphrase is typically a word or phrase that the customer can remember easily and is used, if necessary, by the verification system 102 to perform further verification of the customer.

The passphrase is also recorded in the voice print database 106 and stored in association with the specified bank account number (step 206). At step 208, the verification system 102 terminates the call and enrollment is completed.

Figure 3:
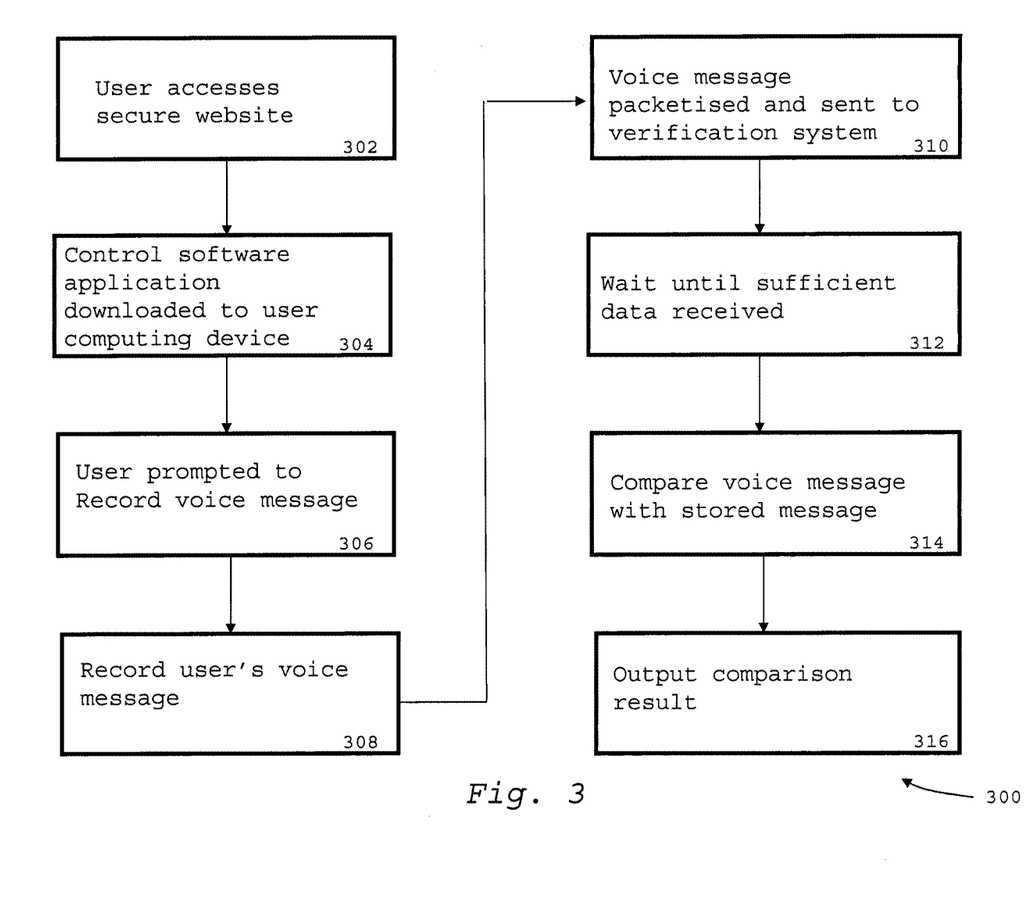
FIG. 3 is a flow diagram showing the method steps for verifying a user's identity, in accordance with an embodiment of the present invention.

With reference to FIGS. 1 and 3, the first general method embodiment of the invention will now be described.

The first step 302 of the method involves the user entering the HTTP network address of the secure customer banking webpage, using their user computing device 108. According to the embodiment described herein, the webpage is programmed in a hypertext mark-up language (HTML) format. The HTML webpage includes a control software application in the form of a Java applet which automatically downloads to the user computing device upon a connection being established with the website (step 304). The Java applet is programmed to interact with the user computing device 108 for conducting the verification process. To do so, the Java applet first locates driver software for an audio recording program residing on the user computing device 108 which is capable of interacting with a microphone input to record audio. For Windows based operating systems, this will typically be the "Sound Recorder" software program. In an alternative embodiment, the Java applet includes its own code for providing the recording functionality. In the next step 306, the Java applet causes the visual display of the user computing device 108 to display a message prompting the user to record a voice message. In this embodiment, the message prompts the user to both type (using their keypad) and say their bank account number which is recorded by the audio recording software. The audio recording software stores the voice message as an electronic file (step 308). Typically, the electronic file will be recorded as a compressed waveform audio file (WAV), however other suitable voice compression and encryption file formats and/or algorithms may also be recognised by the voice authentication server 104.

Figure 4:
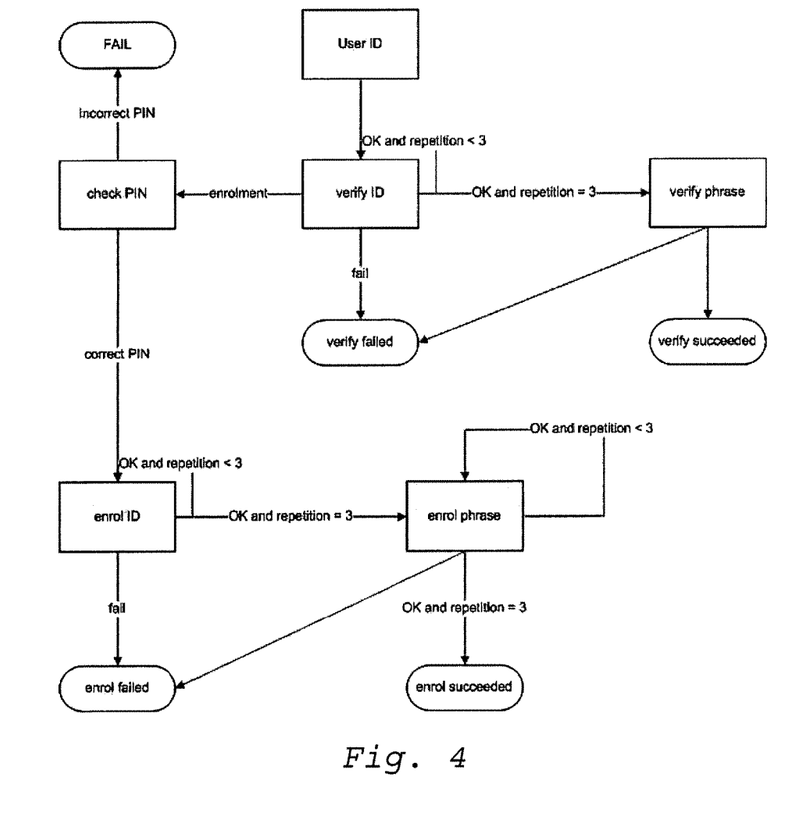
FIG. 4 is a flow diagram showing process steps for a state machine residing on the authentication server depicted in FIG. 1, in accordance with an embodiment of the invention.

Once the user's voice message has been recorded as an electronic file, the Java software application associates the electronic file with a session ID number provided to the user computing device 108 by the secure customer banking site and loads the same into a file structure. The Java software code subsequently causes the user computing device 108 to create a connection with the authentication server 104 of the verification system 102. In step 310, the file structure is embedded in an XML stream, packetised and sent to the authentication server 104 over a HTTPS secure connection for verification. In accordance with this embodiment, the state machine for controlling the XML transaction resides on the authentication server 104. A flow diagram showing process steps performed by the state machine in accordance with an embodiment is shown in FIG. 4.

In step 312, the voice authentication server 104 determines whether sufficient voice data has been received to make a verifiable comparison. In accordance with the embodiment described herein, the voice authentication server 104 waits until all of the packets have been successfully received before carrying out the comparison. Packets which are not successfully received are re-sent using standard TCP/IP communications protocol. The voice authentication server 104 then proceeds to "un-pack" the voice data and extract the recorded message and session identifier from the XML stream. The claimed identity is also extracted from the XML stream and used as an index to look up the associated voice print information stored in the voice print database 106. At step 314, voice authentication algorithms operating on the voice authentication server 104 compare the voice print information indexed by the claimed identity information against the recorded voice message (which was previously embedded in the XML stream) to determine a match. Specifically, the comparison step involves performing an account analysis of the speech signals provided in both the recorded voice message and stored message, and extracting the relevant acoustic features for statistical analysis and comparison. The session ID number is also analysed to confirm that the file is unique and not simply a copy of a file that has been sent previously, thus preventing attacks from hackers.

The voice authentication algorithms operating on the voice authentication server 104 generate verification data in the form of a probability score (i.e. an indication of the likelihood that the person to be identified is the user) of a match condition based on the statistical analysis. The probability score is subsequently transmitted to the Internet banking server 112 referenced by the session ID number extracted from the XML stream.

Upon receiving the probability score from the voice authentication server, the Internet banking server 112 runs a set of business rules to determine whether or not to allow access to the user. The business rules may accept, decline or ask the user to repeat the verification process if the score is not above a pre-set threshold.

In one embodiment, three threshold states may be employed. If above an upper threshold, the voice data (and therefore the identity of the user) is deemed as verifiable without question. If the score is above a lower threshold but below the upper threshold, the user may be asked to repeat the verification process. If the score does not exceed the upper threshold within two repeats, then the user will not be allowed access to the secure service. If the score is below the lower threshold, then the user is rejected, with an ability to try again.

In an alternative embodiment, a threshold may be set relative to an amount being transacted for the secure service. If only a small amount is being transacted, then the business rules could apply a low threshold, whilst if a large amount is being transacted then a higher threshold may be set and additional verification information may be requested (e.g. the user may be asked their birth date, mother's maiden name etc). In another embodiment, a customer may be allowed to access to a secure service; but the threshold information only checked if the person undertakes a high assurance action, such as transferring money out of an account or changing account details. Again, based on the amount, the transaction could be based on varying threshold levels or a request for further verification information sought.

The secure service provider may vary threshold levels and business rules if the customer has not been authenticated for a long period of time. Varied business rules and threshold levels may also be utilised where an excessive number of requests are being made against a specific identity (this could be an attack on that voiceprint template to test strength—for example)

Embodiments of the present invention also include methods to protect against identity fraud, such as, for example, where recordings of a person's voice are taped and played back to the verification system so as to fraudulently gain access to the person's account. In one embodiment the method for determining fraudulence comprises the steps of receiving a voice data of a person to be identified, comparing the voice data with voice data previously provided for verification and, based on the comparison, providing an indication of the likelihood that the received voice data is potentially fraudulent. In one embodiment the received voice data is considered fraudulent if it is too similar to a previously provided voice data. If the voice data is determined to be fraudulent, a challenge mechanism may be initiated. The challenge mechanism may involve displaying a randomly generated string of alphanumeric characters on a visual display of the user computing device 108 which the user is then required to repeat and send as voice data back to the verification system 102 for further verification.

A detailed description of the different elements utilised to implement the above described methods will now be given.

As mentioned in preceding paragraphs, the verification system comprises a voice authentication server 104 which functions to verify the identity of users of the computing devices 108 wanting to gain access to a secure service. In the described embodiment, the secure service was a customer banking webpage hosted by an Internet banking server 112. To perform this function, the voice authentication server 104 comprises computer hardware including a processor, motherboard, random access memory, hard disk and a power supply. The voice authentication server 104 also includes an operating system which co-operates with the hardware to provide an environment in which software applications can be executed. In this regard, the hard disk of the voice authentication server 104 is loaded with voice authentication software such as Syrinx Speech Master program, which is available from Syrinx Speech Technologies, Australia. The hard disk may also be loaded with speech recognition software which operates in conjunction with the voice authentication software to provide voice recognition capabilities. The server 104 is also coupled to a voice print database 106 which is arranged to store voice prints of account holders of the secure customer banking site who have previously enrolled with the verification system 102. The hard disk of the voice authentication server 104 also provides the state machine for driving the java applet which is downloaded to the user computing device in response to accessing the secure Internet banking website. For communicating with the user computing devices 108 and secure service provider system 112, the verification system 102 comprises a transmitter/receiver in the form of a network card.

The user computing devices 108(*a*)-(*f*) are in the form of network-enabled personal computers. The personal computers include typical hardware such as a motherboard, central processing unit, random access memory, a hard disk, network card, power supply and visual display unit. The personal computers also include a microphone for receiving voice commands and recording voice messages. In addition to the hardware, the hard disk of each personal computer 108 is loaded with an operating system and browser software which interact with the hardware to allow the personal computer 108 to connect to the Internet and access the secure web pages. The personal computer also includes driver software for an audio recording program, such as the "Sound Recorder" program (which is part of the Microsoft Windows XP™ operating system software) for interacting with the microphone to record the voice messages.

As previously discussed, the communication system 110 is in the form of a public access packet-switched network, such as the Internet. Personal computers 108 are able to exchange data (more particularly, XML code and packetised voice messages) with the voice authentication server 104 using a packet-switched network protocol, such as the TCP/IP protocol. In an alternative embodiment (not shown), the communication system may additionally comprise a third generation ("3G") or GPRS enabled mobile telephone network connected to the packet-switched network which can be utilised to access the voice authentication server 104. In such an embodiment, the user computing devices 108 would have wireless capabilities for transmitting the voice message. The wireless computing devices may include, for example, mobile phones, personal computers having wireless cards and any other mobile communication device which facilitates voice recordal functionality. In another embodiment, the present invention may employ an 802.11 based wireless network or some other personal virtual network.

The last element in the system 100 is the secure service provider system which, according to the embodiment described herein, is in the form of an Internet banking server hosting a HTML customer banking webpage. The secure service provider system comprises a transmitter/receiver in the form of a network card for communicating with the third party verification system 102 and user computing devices 108, over communication system 110. As previously mentioned, the HTML webpage includes a device (control software application) in the form of a java applet which automatically downloads to the personal computer upon accessing the webpage, for facilitating recordal of the user's voice message.

Although in embodiments described in preceding paragraphs the verification system was in the form of a "third party" or centralised system, it will be understood that the verification system need not be a third party system but instead may be incorporated into the secure service provider system.

Furthermore, in embodiments of the invention a timestamp may be included in the file structure sent by the user computing device to further assess the validity of the message. The timestamp may include a randomly generated number string which is constructed using the time clock of the user computing device. It will also be understood that in alternative embodiments, the voice data may be reconstructed in disparate portions and compared with like portions of the stored voice data for comparison.

It is also noted that although the enrollment process described in preceding paragraphs was carried out by telephone, it could equally be performed over a packet-switched network utilising the microphone of the user computing device. In an embodiment, the user accesses a website associated with the verification system and enters personal identification information for initial verification. This information may include details such as the user's passport number, driver's licence number, birth certificate information etc. If the personal identification information matches information stored on an identity management database, then the person is deemed by the verification system as being legitimate. At this point online enrollment of the user's voice print is initiated. In an embodiment a sample of the user's voice is provided in much the same way as for carrying out actual verification (see steps 304 to 310 previously described). The voice sample is subsequently stored by the verification system as a voiceprint template in association with one or more fields of the person's personal identification information. In this manner, the identity of the person can be reliably authenticated when they next access the verification system or a secure service provider system.

As described in preceding paragraphs, embodiments of the present invention may provide both voice authentication and speech recognition functionality. For example, in an electronic banking environment, a person may carry out an e-commerce transaction (e.g. transferring money between accounts) by simply stating how the transaction is to be carried out and sending their stated message to the verification system in a voice message file, using techniques previously described. If the system establishes that the person is a verifiable person, then the stated message is extracted (using the speech recognition capability) so as to determine what actions needed to be taken to carry out the transaction. It should also be noted that the speech recognition and voice authentication capabilities need not always be carried out in conjunction with one another. For example, in some instances only the speech recognition capabilities may be required, whereas in other instances only the voice authentication functionality may be required.

While the invention has been described with reference to the present embodiment, it will be understood by those skilled in the art that alterations, changes and improvements may be made and equivalents may be substituted for the elements thereof and steps thereof without departing from the scope of the invention. In addition, many modifications may be made to adapt the invention to a particular situation or material to the teachings of the invention without departing from the central scope thereof. Such alterations, changes, modifications and improvements, though not expressly described above, are nevertheless intended and implied to be within the scope and spirit of the invention. Therefore, it is intended that the invention not be limited to the particular embodiment described herein and will include all embodiments falling within the scope of the independent claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The claims defining the invention are as follows:

1. A method of verifying the identity of a person wanting to access a secure service application implemented by a secure service provider system, the method comprising:
   controlling a network enabled user computing system of the person to automatically download to the user computing system a control software application from a server computer implemented by the secure service provider system responsive to the user computing system attempting to access the secure service application, the control software application being downloaded over the Internet;
   the control software application being executable by the network enabled user computing system to operate voice recording hardware which records a voice data of the person and to send the recorded voice data to an independent verification system separate of the secure service provider system; and
   the recorded data being sent over a data communications network to the independent verification system which verifies the person's identity wherein the user computing system is controlled by a state machine of the independent verification system which drives the control software application to send the recorded voice data to the independent verification system for subsequent verification and wherein the independent verification system subsequently communicates data indicative of the result of the verification to the secure service system for determining whether to grant the person access to the secure service application.

2. A method of verifying the identity of a person in accordance with claim 1, wherein the secure service application is a website associated with the secure service.

3. A method of verifying the identity of a person in accordance with claim 1, wherein the verification system waits for sufficient voice data to be received to make a verifiable comparison before making the verification.

4. A method of verifying the identity of a person in accordance with claim 3, wherein all of the voice data is received before making the verification.

5. A method of verifying the identity of the person in accordance with claim 3, wherein the verification system compares the voice data with a stored voice data of an identified user and, based on the comparison, provides an indication of the likelihood that the person to be identified is the identified user.

6. A method of verifying the identity of a person in accordance with claim 5, wherein the indication is communicated to the secure service provider to determine whether to allow access to the person.

7. A method of verifying the identity of a person in accordance with claim 6, wherein the secure service provider utilises one or more business rules to make the determination.

8. A method of verifying the identity of a person in accordance with claim 1, wherein the voice data is an electronic file.

9. A method of verifying the identity of a person in accordance with claim 1, wherein at least one of a time stamp and session identifier is associated with the voice data and wherein the time stamp/identifier is processed to determine if the voice data is valid.

10. A method of verifying the identity of a person in accordance with claim 1, wherein the data communication network is the Internet.

11. A non-transitory computer readable medium providing a computer program comprising at least one instruction for controlling a computer system to implement a method in accordance with claim 1.

12. A method of verifying the identity of a person in accordance with claim 1, wherein the independent verification system subsequently communicates data indicative of the result of the verification directly to the secure service system for determining whether to grant the person access to the secure service application.

13. A secure service provider computer system, the computer system comprising:
    a server computer electronically communicable with a user computing system to download to the user computing system a control software application which is responsive to the user computing system for accessing a secure service application implemented by the secure service provider computer system;
    the control software application being executable by the user computing system to cause associated voice recording hardware to record a voice data of a user and send the recorded voice data to a verification computer system separate from the secure service provider computer system over a data communications network to verify the user's identity prior to authentication of the user,
    wherein the user computing system is controlled to download, by a state machine of the independent verification system which drives the control software application, in order to control the control software application based on computer readable instructions communicated to the network enabled user computing system when attempting to access the secure service application.

14. A secure service provider system in accordance with claim 13, wherein the secure service application is a website.

15. A secure service provider system in accordance with claim 13, wherein the verification system waits for sufficient voice data to be received to make a verifiable comparison before making the verification.

16. A secure service provider system in accordance with claim 13, wherein all of the voice data is received before making the verification.

17. A secure service provider system in accordance with claim 13, wherein the step of making the verification comprises comparing the voice data with a stored voice data of an identified user and, based on the comparison, providing an indication of the likelihood that the user of the computing system is the identified user.

18. A secure service provider system in accordance with claim 17, wherein the indication is communicated to the secure service provider system to determine whether to allow access to the user of the user computing system.

19. A secure service provider system in accordance with claim 13, wherein the voice data is an electronic file.

20. A secure service provider system in accordance with claim 13, wherein at least one of a time stamp and session identifier is associated with the voice data and wherein the stamp/identifier is processed to determine if the voice data is valid.

21. A method of verifying the identity of a person attempting to access a website implemented by a secure service provider system, the method comprising:
    controlling a browser implemented by a network enabled user computing system of the person to download a control software application from a remote server, the control software application being executable by the browser to: (a) operate voice recording hardware for recording voice data of the person; and (b) once recorded, send the recorded voice data to an independent verification system separate of the secure service provider system, over a data communications network for verifying the person's identity, wherein the user computing system is controlled to download the control software application based on computer readable instructions communicated to the browser when attempting to access a URL of the website.

* * * * *